US010452660B2

(12) United States Patent
Adams et al.

(10) Patent No.: US 10,452,660 B2
(45) Date of Patent: Oct. 22, 2019

(54) GENERATION AND MAINTENANCE OF SYNTHETIC CONTEXT EVENTS FROM SYNTHETIC CONTEXT OBJECTS

(71) Applicant: International Business Machines Corporation, Armonk, NY (US)

(72) Inventors: Samuel S. Adams, Rutherfordton, NC (US); Robert R. Friedlander, Southbury, CT (US); James R. Kraemer, Santa Fe, NM (US); Jeb R. Linton, Manassas, VA (US)

(73) Assignee: International Business Machines Corporation, Armonk, NY (US)

( * ) Notice: Subject to any disclaimer, the term of this patent is extended or adjusted under 35 U.S.C. 154(b) by 759 days.

(21) Appl. No.: 14/789,188

(22) Filed: Jul. 1, 2015

(65) Prior Publication Data
US 2015/0302055 A1 Oct. 22, 2015

Related U.S. Application Data

(63) Continuation-in-part of application No. 13/906,658, filed on May 31, 2013, now abandoned.

(51) Int. Cl.
*G06F 17/30* (2006.01)
*G06F 16/2457* (2019.01)

(52) U.S. Cl.
CPC .............. *G06F 16/24575* (2019.01)

(58) Field of Classification Search
CPC .............. G06F 17/30528; G06F 16/24575
USPC ........................................ 707/758
See application file for complete search history.

(56) References Cited

U.S. PATENT DOCUMENTS

| 5,664,179 | A | 9/1997 | Tucker |
| 6,633,868 | B1 | 10/2003 | Min et al. |
| 7,058,628 | B1 | 6/2006 | Page |
| 7,401,057 | B2 * | 7/2008 | Eder ............... G06N 5/022 706/20 |

(Continued)

OTHER PUBLICATIONS

Faulkner, P., "Common Patterns for Synthetic Events in Websphere Business Events" Jan. 15, 2011, http://www.ibm.com/developerworks/websphere/bpmjournal/1101_faulkner2/1101_faulker2.html, pp. 1-6.

(Continued)

*Primary Examiner* — Mark E Hershley
(74) *Attorney, Agent, or Firm* — Brown & Michaels, PC; Jay Wahlquist (57) ABSTRACT

A method, computer program product and system for generating and maintaining synthetic context events. The steps include searching a data structure of synthetic context-based objects and associated data for a pattern of context exhibited at a first specified frequency within a first specified time period; combining the synthetic context-based objects and associated data exhibiting the pattern of context exhibited at the first specified frequency within the first specified time period into a synthetic context event; and optimizing and maintaining the synthetic context event by searching the data structure for additional synthetic context-based objects and associated data exhibiting a same pattern of context at a second specified time period different than the first specified time period and adding the additional synthetic context-based objects and associated data to the synthetic context event.

20 Claims, 8 Drawing Sheets

(56) References Cited

U.S. PATENT DOCUMENTS

| | | | |
|---|---|---|---|
| 7,502,779 B2 * | 3/2009 | Brockway | G06F 17/30864 |
| 7,523,123 B2 | 4/2009 | Yang et al. | |
| 7,752,154 B2 | 7/2010 | Friedlander et al. | |
| 7,778,955 B2 | 8/2010 | Kuji | |
| 7,783,586 B2 | 8/2010 | Friedlander et al. | |
| 7,788,202 B2 | 8/2010 | Friedlander et al. | |
| 7,788,203 B2 | 8/2010 | Friedlander et al. | |
| 7,792,774 B2 | 9/2010 | Friedlander et al. | |
| 7,792,776 B2 | 9/2010 | Friedlander et al. | |
| 7,792,783 B2 | 9/2010 | Friedlander et al. | |
| 7,805,390 B2 | 9/2010 | Friedlander et al. | |
| 7,805,391 B2 | 9/2010 | Friedlander et al. | |
| 7,809,660 B2 | 10/2010 | Friedlander et al. | |
| 7,853,611 B2 | 12/2010 | Friedlander et al. | |
| 7,870,113 B2 | 1/2011 | Gruenwald | |
| 7,930,262 B2 | 4/2011 | Friedlander et al. | |
| 7,953,686 B2 | 5/2011 | Friedlander et al. | |
| 7,970,759 B2 | 6/2011 | Friedlander et al. | |
| 8,046,358 B2 | 10/2011 | Thattil | |
| 8,055,603 B2 | 11/2011 | Angell et al. | |
| 8,145,582 B2 | 3/2012 | Angell et al. | |
| 8,199,982 B2 | 6/2012 | Fueyo et al. | |
| 2001/0034686 A1 * | 10/2001 | Eder | G06Q 10/06 705/36 R |
| 2003/0177187 A1 * | 9/2003 | Levine | A63F 13/10 709/205 |
| 2004/0064316 A1 * | 4/2004 | Gallino | G10L 15/063 704/251 |
| 2004/0162838 A1 | 8/2004 | Murayama et al. | |
| 2006/0053009 A1 * | 3/2006 | Jeong | G10L 15/30 704/234 |
| 2006/0190195 A1 | 8/2006 | Watanabe et al. | |
| 2007/0179972 A1 * | 8/2007 | Wright | G06F 17/30713 |
| 2007/0185850 A1 | 8/2007 | Walters et al. | |
| 2007/0260595 A1 * | 11/2007 | Beatty | G06F 17/30964 |
| 2008/0005067 A1 | 1/2008 | Dumais et al. | |
| 2008/0063458 A1 * | 3/2008 | Bangel | B41F 5/00 400/694 |
| 2008/0086442 A1 | 4/2008 | Dasdan et al. | |
| 2008/0275906 A1 | 11/2008 | Rhoads et al. | |
| 2009/0037351 A1 * | 2/2009 | Kristal | G06Q 10/04 706/12 |
| 2009/0299988 A1 | 12/2009 | Hamilton, II et al. | |
| 2010/0036269 A1 * | 2/2010 | Ferren | A61B 5/02007 600/504 |
| 2010/0057737 A1 * | 3/2010 | Srinivasan | G06K 9/62 707/E17.039 |
| 2010/0255772 A1 * | 10/2010 | Hellman | G11B 27/034 455/3.06 |
| 2010/0305499 A1 * | 12/2010 | Matsiev | A61B 5/145 604/67 |
| 2011/0040724 A1 | 2/2011 | Dircz | |
| 2011/0066649 A1 | 3/2011 | Berlyant et al. | |
| 2011/0137882 A1 | 6/2011 | Weerasinghe | |
| 2012/0256786 A1 * | 10/2012 | Bowring | G01S 7/024 342/188 |
| 2012/0296910 A1 | 11/2012 | Skubacz et al. | |
| 2013/0253892 A1 * | 9/2013 | Friedlander | G06F 19/22 703/11 |
| 2014/0344292 A1 * | 11/2014 | Friedlander | G06F 17/10 707/752 |
| 2015/0317449 A1 * | 11/2015 | Eder | G06Q 50/22 600/595 |

OTHER PUBLICATIONS

Evaggelio Pitoura et al., "Context in Databases"; University if Ioannina, Greece, 2004, pp. 1-19.

"Rock—Definition and More from the Free Merriam-Webster Dictionary"; http://www,merriam-webster.com/dictionary/rock; retrieved on Feb. 2015.

Non-final office action in U.S. Appl. No. 13/906,658 dated Mar. 5, 2015.

* cited by examiner

GENERATION AND MAINTENANCE OF SYNTHETIC CONTEXT EVENTS FROM SYNTHETIC CONTEXT OBJECTS

REFERENCE TO RELATED APPLICATIONS

This application is a continuation-in-part of parent patent application Ser. No. 13/906,658, filed May 31, 2013, entitled "GENERATION AND MAINTENANCE OF SYNTHETIC EVENTS FROM SYNTHETIC CONTEXT OBJECTS". The aforementioned application is hereby incorporated herein by reference.

BACKGROUND

The present invention relates to synthetic events, and more specifically to the generation and maintenance of synthetic events from synthetic context objects.

Computer processing of large amounts of data is often carried out linearly by computer processors, with the computer processing and grouping data that shares granularities and cardinalities. Context which may be relevant to the data, or data which does not share granularity or cardinality with other data, is not taken into account during the processing of data by the computer, neglecting possible relationships between seemingly unrelated data.

SUMMARY

According to one embodiment of the present invention, a method of generating and maintaining synthetic context events from a data structure. The data structure comprising: a context object database having a plurality of context objects; a non-contextual data object database having at least one non-contextual data object; a synthetic context-based object database having a plurality of synthetic context-based objects associated with the plurality of context objects, the non-contextual data objects being linked to the synthetic context-based objects; and a synthetic context event database comprising synthetic context events linked to the synthetic context-based objects. The method comprising the steps of: a computer searching the synthetic context-based objects and associated data of context objects for a pattern of context exhibited at a first specified frequency within a first specified time period; the computer combining the synthetic context-based objects and associated data of context objects exhibiting the pattern of context exhibited at the first specified frequency within the first specified time period into a synthetic context event; and the computer optimizing and maintaining the synthetic context event by searching the data structure for additional synthetic context-based objects and associated data exhibiting a same pattern of context at a second specified time period different than the first specified time period and adding the additional synthetic context-based objects and associated data to the synthetic context event.

According to another embodiment of the present invention, a computer program product for generating and maintaining synthetic context events from a data structure. The data structure comprising: a context object database having a plurality of context objects; a non-contextual data object database having at least one non-contextual data object; a synthetic context-based object database having a plurality of synthetic context-based objects associated with the plurality of context objects, the non-contextual data objects being linked to the synthetic context-based objects; and a synthetic context event database comprising synthetic context events linked to the synthetic context-based objects. The computer program product further comprising a computer coupled to the data structure, the computer comprising at least one processor, one or more memories, one or more computer readable storage media, the computer program product comprising a computer readable storage medium having program instructions embodied therewith, the program instructions executable by the computer to perform a method comprising: searching, by the computer, the synthetic context-based objects and associated data of context objects for a pattern of context exhibited at a first specified frequency within a first specified time period; combining, by the computer, the synthetic context-based objects and associated data of context objects exhibiting the pattern of context exhibited at the first specified frequency within the first specified time period into a synthetic context event; and optimizing and maintaining, by the computer, the synthetic context event by searching the data structure for additional synthetic context-based objects and associated data exhibiting a same pattern of context at a second specified time period different than the first specified time period and adding the additional synthetic context-based objects and associated data to the synthetic context event.

According to another embodiment of the present invention, a system for generating and maintaining synthetic context events from a data structure comprising: a context object database having a plurality of context objects; a non-contextual data object database having at least one non-contextual data object; a synthetic context-based object database having a plurality of synthetic context-based objects associated with the plurality of context objects, the non-contextual data objects being linked to the synthetic context-based objects; and a synthetic context event database comprising synthetic context events linked to the synthetic context-based objects. The computer system comprising a computer coupled to a data structure, the computer comprising at least one processor, one or more memories, one or more computer readable storage media having program instructions executable by the computer to perform the program instructions comprising: searching, by the computer, the synthetic context-based objects and associated data of context objects for a pattern of context exhibited at a first specified frequency within a first specified time period; combining, by the computer, the synthetic context-based objects and associated data of context objects exhibiting the pattern of context exhibited at the first specified frequency within the first specified time period into a synthetic context event; and optimizing and maintaining, by the computer, the synthetic context event by searching the data structure for additional synthetic context-based objects and associated data exhibiting a same pattern of context at a second specified time period different than the first specified time period and adding the additional synthetic context-based objects and associated data to the synthetic context event.

DETAILED DESCRIPTION

The illustrative embodiments of the present invention recognize that a synthetic context event may be defined as a clustering of information based on preset parameters. The synthetic context event may be an "event" that represents a probability of a future fact or happening, or that represents a probability that a potential past fact or happening has occurred, or that represents a probability that a potential current fact or happening is occurring, with the mathematical formulation of a synthetic context event represented by the operation $S(p1) ==> F(p2)$, where S is the set of input facts with probability p1 that potentiates future event F with probability p2. Note that future event F in this operation can represent represents a probability that a potential past fact or happening has occurred, or that represents a probability that a potential current fact or happening is occurring, because these probabilities did not exist before a request to calculate them was formulated. Information or data from intersecting data constructs may be a result of a synthetic context event.

Additionally, a synthetic context event can be considered a recordable, definable, addressable data interrelationship in a solution space, wherein the interrelationship is represented with a surrogate key, and wherein the synthetic context event is able to interact with other events or facts for purposes of computer-assisted analysis. The events or facts may be spread across granularities and cardinalities. The synthetic context events can combine heterogeneous data which includes context into a meaningful group or event to allow non-linear reasoning across granularities and cardinalities by a computer processor to change the seemingly unrelated data into binary data that the computer can easily process.

Synthetic context events are composed of physically or logically observable events, not suppositions about mental state, unless they can be supported by or characterized as observable fact or numbers. Synthetic context events can be compared to generate additional synthetic context events. The synthetic context events may also include time or be based on a specific time period and frequency of occurring.

Figure 1:
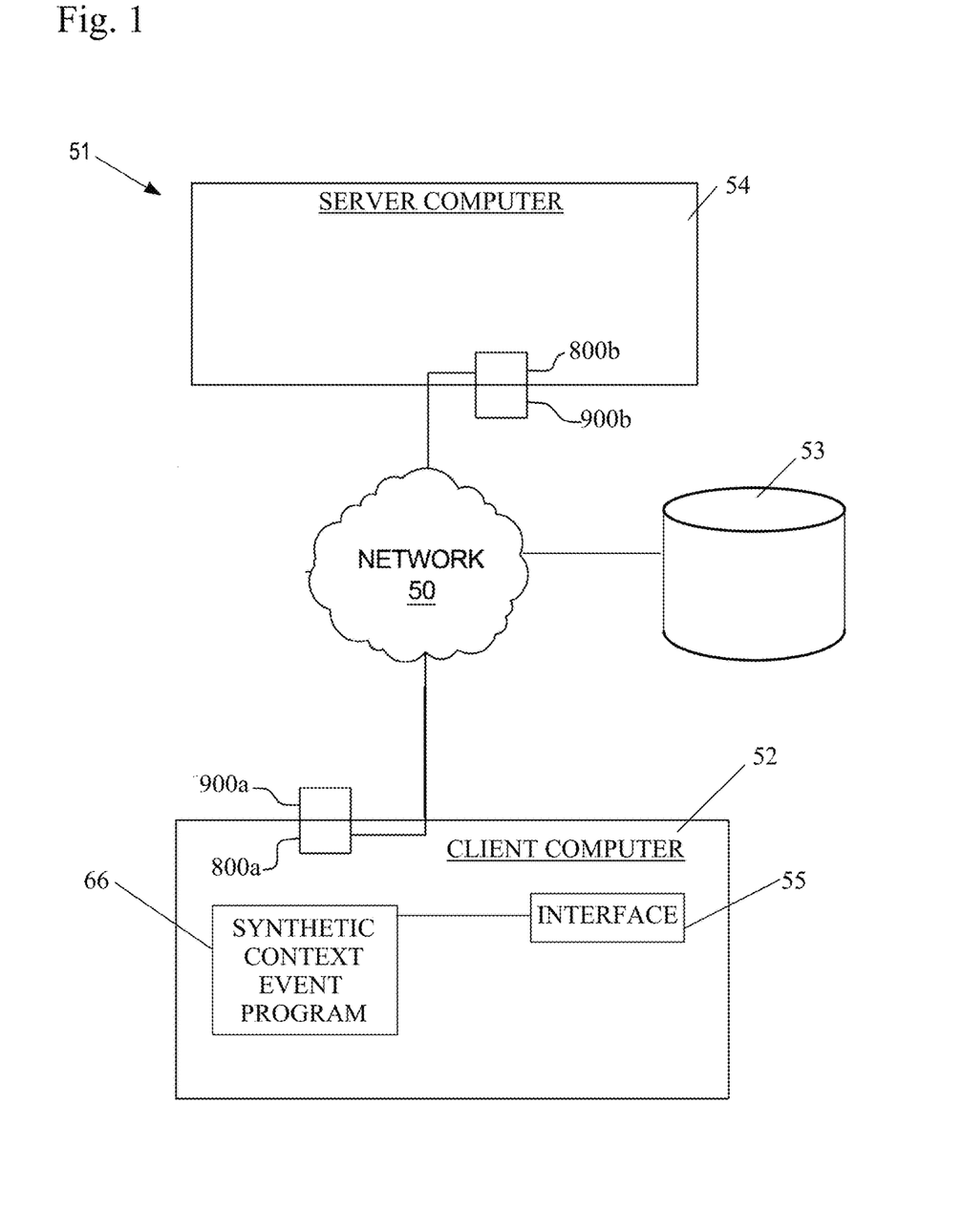
FIG. 1 depicts an exemplary diagram of a possible data processing environment in which illustrative embodiments may be implemented.

FIG. 1 is an exemplary diagram of a possible data processing environment provided in which illustrative embodiments may be implemented. It should be appreciated that FIG. 1 is only exemplary and is not intended to assert or imply any limitation with regard to the environments in which different embodiments may be implemented. Many modifications to the depicted environments may be made.

Referring to FIG. 1, network data processing system 51 is a network of computers in which illustrative embodiments may be implemented. Network data processing system 51 contains network 50, which is the medium used to provide communication links between various devices and computers connected together within network data processing system 51. Network 50 may include connections, such as wire, wireless communication links, or fiber optic cables.

In the depicted example, client computer 52, repository 53, and server computer 54 connect to network 50. In other exemplary embodiments, network data processing system 51 may include additional client computers, storage devices, server computers, and other devices not shown. Client computer 52 includes a set of internal components 800a and a set of external components 900a, further illustrated in FIG. 8. Client computer 52 may be, for example, a mobile device, a cell phone, a personal digital assistant, a netbook, a laptop computer, a tablet computer, a desktop computer, or any other type of computing device.

Client computer 52 may contain an interface 55. Through the interface 55, specified time periods, frequency of context patterns, synthetic context-based objects, and synthetic context events or synthetic events may be viewed by the user. The interface 55 may accept commands and data entry from a user, for example specified time periods in which to search for a repeating pattern of context or frequency of a context patterns. The interface 55 can be, for example, a command line interface, a graphical user interface (GUI), or a web user interface (WUI) through which a user can access a synthetic context event program 66 on the client computer 52.

In the depicted example, server computer 54 provides information, such as boot files, operating system images, and applications to client computer 52. Server computer 54 includes a set of internal components 800b and a set of external components 900b illustrated in FIG. 8 and may also include the components shown in FIG. 8.

Figure 8:
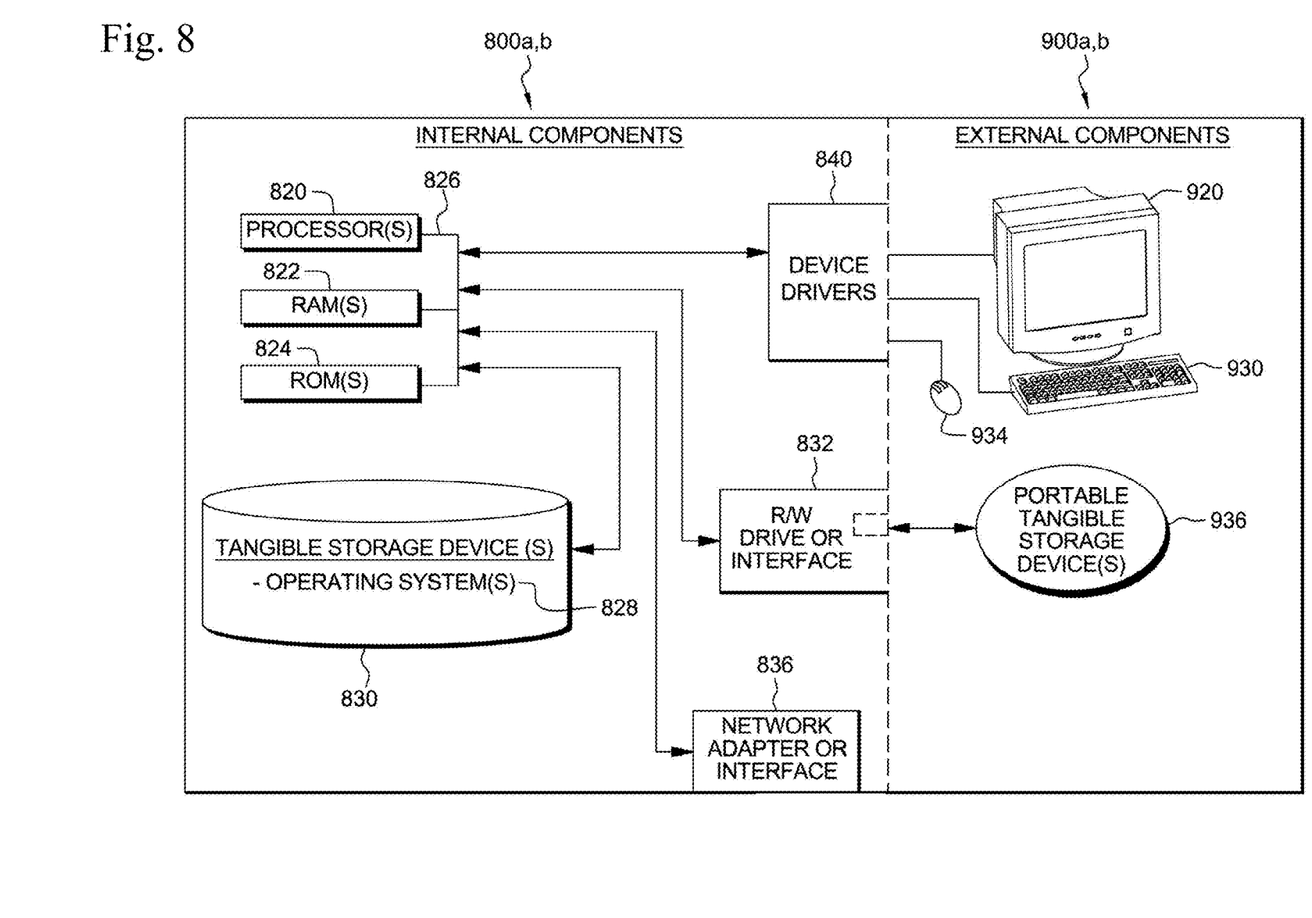
FIG. 8 shows illustrates internal and external components of a client computer and a server computer in which illustrative embodiments may be implemented.

Program code, synthetic context-based objects, synthetic context events, and programs such as a synthetic context event program 66 may be stored on at least one of one or more computer-readable tangible storage devices 830 shown in FIG. 8, on at least one of one or more portable computer-readable tangible storage devices 936 as shown in FIG. 8, on repository 53 connected to network 50, or downloaded to a data processing system or other device for use.

For example, program code, synthetic context-based objects, synthetic context events and programs such as a synthetic context event program 66 may be stored on at least one of one or more tangible storage devices 830 on server computer 54 and downloaded to client computer 52 over network 50 for use on client computer 52. Alternatively, server computer 54 can be a web server, and the program code, synthetic context-based objects, synthetic context events, and programs such as a synthetic context event program 66 may be stored on at least one of the one or more tangible storage devices 830 on server computer 54 and accessed on client computer 52. Synthetic context event program 66 can be accessed on client computer 52 through interface 55. In other exemplary embodiments, the program code, synthetic context-based objects, synthetic context events, and synthetic context event program 66 may be stored on at least one of one or more computer-readable tangible storage devices 830 on client computer 52 or distributed between two or more servers.

Figure 2:
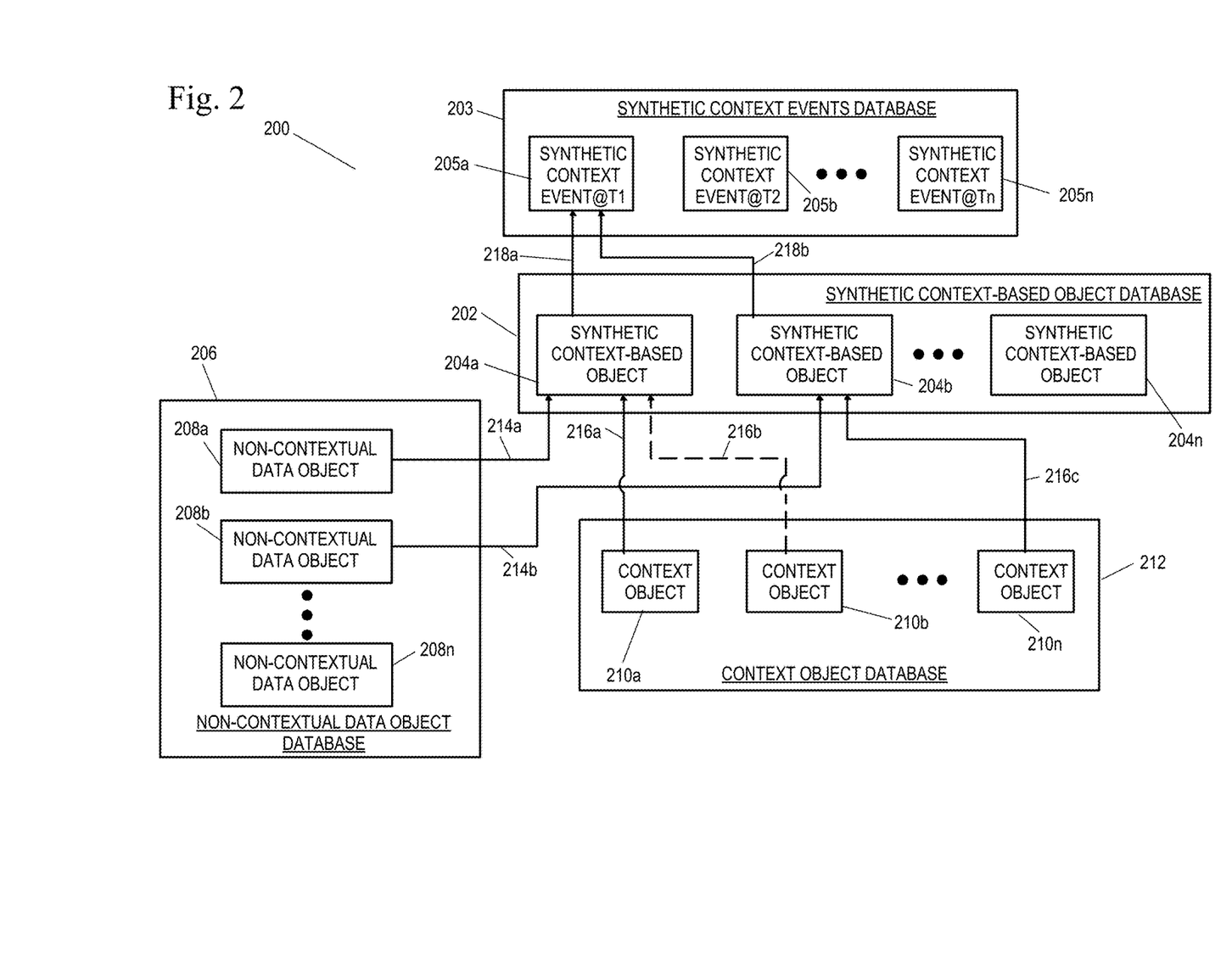
FIG. 2 shows a process for generating one or more synthetic context-based objects.

With reference now to FIG. 2, a process for generating one or more synthetic context based objects in a system 200 is presented. Note that system 200 is a processing and storage logic system found in computer and/or data storage system 51 shown in FIG. 1, which process, support, and/or contain the databases, pointers, and objects depicted in FIG. 2.

Within processing and storage logic system 200 is a synthetic context events database 203 which is comprised of synthetic context events 205a-205n (thus indicating "n" objects, where "n" is an integer) in different times $t_1$-$t_n$. Each of the synthetic events 205a-205n is comprised of multiple synthetic context-based objects 204a-204n (thus indicating an "n" quantity of objects, where "n" is an integer) stored in a synthetic context-based object database 202. Each of the synthetic context-based objects 204a-204n is defined by at least one non-contextual data object and at least one context object. That is, at least one non-contextual data object is associated with at least one context object to define one or more of the synthetic context-based objects 204a-204n. The non-contextual data object database 206 contains non-contextual data objects 208a-208n which ambiguously relates to multiple subject-matters, and the context object provides a context that identifies a specific subject-matter, from the multiple subject-matters, of the non-contextual data object. The synthetic context events 205a-205n combine heterogeneous data which includes context into a meaningful group or event to allow non-linear reasoning across granularities and cardinalities by a computer processor to change the seemingly unrelated data into binary data that the computer can easily process. The synthetic context event 205a-205n includes a pattern of repeating context or frequency of context within at least one time period.

Note that the non-contextual data objects contain data that has no meaning in and of itself. That is, the data in the context objects are not merely attributes or descriptors of the data/objects described by the non-contextual data objects. Rather, the context objects provide additional information about the non-contextual data objects in order to give these non-contextual data objects meaning. Thus, the context objects do not merely describe something, but rather they define what something is. Without the context objects, the non-contextual data objects contain data that is meaningless; with the context objects, the non-contextual data objects become meaningful.

For example, assume that a non-contextual data object database 206 includes multiple non-contextual data objects 208a-208n. However, data within each of these non-contextual data objects 208a-208n by itself is ambiguous, since it has no context. That is, the data within each of the non-contextual data objects 208a-208n is data that, standing alone, has no meaning, and thus is ambiguous with regards to its subject-matter. In order to give the data within each of the non-contextual data objects 208a-208n meaning, they are given context, which is provided by data contained within one or more of the context objects 210a-210n stored within a context object database 212. For example, if a pointer 214a points the non-contextual data object 208a to the synthetic context-based object 204a, while a pointer 216a points the context object 210a to the synthetic context-based object 204a, thus associating the non-contextual data object 208a and the context object 210a with the synthetic context-based object 204a (e.g., storing or otherwise associating the data within the non-contextual data object 208a and the context object 210a in the synthetic context-based object 204a), the data within the non-contextual data object 208a now has been given unambiguous meaning by the data within the context object 210a. This contextual meaning is thus stored within (or otherwise associated with) the synthetic context-based object 204a.

Similarly, if a pointer 214b associates data within the non-contextual data object 208b with the synthetic context-based object 204b, while the pointer 216c associates data within the context object 210n with the synthetic context-based object 204b, then the data within the non-contextual data object 208b is now given meaning by the data in the context object 210n. This contextual meaning is thus stored within (or otherwise associated with) the synthetic context based object 204b.

Note that more than one context object can give meaning to a particular non-contextual data object. For example, both context object 210a and context object 210b can point to the synthetic context-based object 204a, thus providing compound context meaning to the non-contextual data object 208a shown in FIG. 2. This compound context meaning provides various layers of context to the data in the non-contextual data object 208a.

Note also that while the pointers 214a-214b and 216a-216c are logically shown pointing toward one or more of the synthetic context-based objects 204a-204n, in one embodiment the synthetic context-based objects 204a-204n actually point to the non-contextual data objects 208a-208n and the context objects 210a-210n. That is, in one embodiment the synthetic context based objects 204a-204n locate the non-contextual data objects 208a-208n and the context objects 210a-210n through the use of the pointers 214a-214b and 216a-216c. A pointer 218a associates synthetic context-based object 204a and pointer 218b associates other synthetic context-based objects 204b with a synthetic context event at time one 205a.

FIGS. 3-5 and 9 show examples in which synthetic context-based objects are defined for the non-contextual data objects. While not shown in all of the examples, synthetic context events may be generated based on a repeating context pattern present in the synthetic context-based object database or context object database. Synthetic context events combine at least seemingly unrelated synthetic context based objects and associated context objects. In addition, synthetic context events combine at least seemingly unrelated non-contextual data objects and associated synthetic context based objects and associated context objects.

Figure 3:
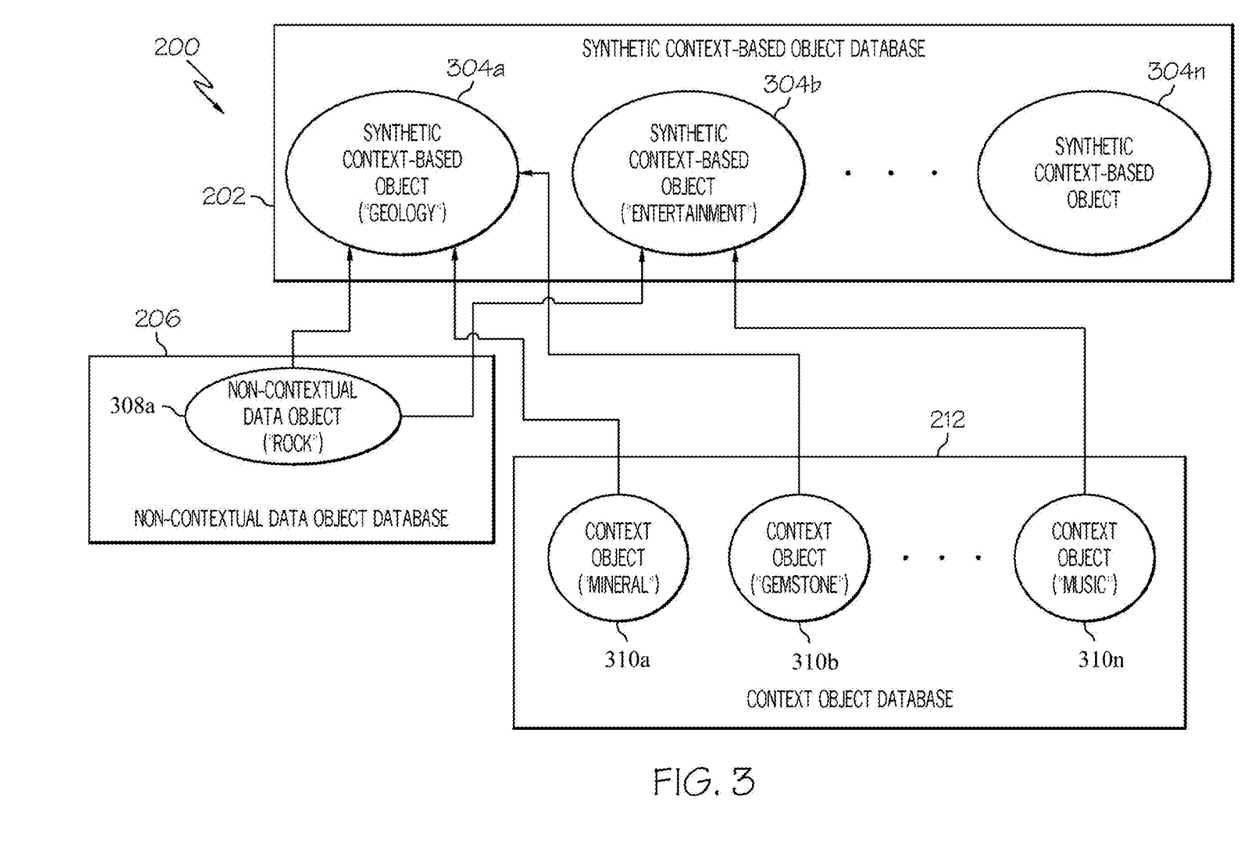
FIG. 3 depicts an exemplary case in which synthetic context-based objects are defined for the non-contextual data object datum "Rock".

Consider now an exemplary case depicted in FIG. 3, in which synthetic context-based objects are defined for the non-contextual data object data "rock". Standing alone, without any context, the word "rock" is meaningless, since it is ambiguous and does not provide a reference to any particular subject-matter. That is, "rock" may refer to a stone, or it may be slang for a gemstone such as a diamond, or it may refer to a genre of music, or it may refer to physical oscillation, etc. Thus, each of these references are within the context of a different subject matter (e.g., geology, entertainment, physics, etc.).

In the example shown in FIG. 3, then, data (i.e., the word "rock") from the non-contextual data object 308a is associated with (e.g., stored in or associated by a look-up table, etc.) a synthetic context-based object 304a, which is devoted to the subject-matter "geology". The data/word "rock" from non-contextual data object 308a is also associated with a synthetic context-based object 304b, which is devoted to the subject-matter "entertainment". In order to give contextual meaning to the word "rock" (i.e., define the term "rock") in the context of "geology", context object 310a, which contains the context datum "mineral", is associated with (e.g., stored in or associated by a look-up table, etc.) the synthetic context-based object 304a. In one embodiment, more than one context datum can be associated with a single synthetic context based object. Thus, in the example shown in FIG. 3, the context object 310b, which contains the datum "gemstone", is also associated with the synthetic context-based object 304a.

Associated with the synthetic context-based object 304*b* is a context object 310*n*, which provides the context/datum of "music" to the term "rock" provided by the non-contextual data object 308*a*. Thus, the synthetic context-based object 304*a* defines "rock" as that which is related to the subject-matter "geology", including minerals and/or gemstones, while synthetic context-based object 304*b* defines "rock" as that which is related to the subject-matter "entertainment", including music.

In one embodiment, the data within a non-contextual data object is even more meaningless if it is merely a combination of numbers and/or letters. For example, consider the data "104-106" contained within a non-contextual data object 408*a* depicted in FIG. 4. Standing alone, without any context, these numbers are meaningless, identify no particular subject-matter, and thus are completely ambiguous. That is, "104-106" may relate to subject-matter such as a medical condition, a physics value, a person's age, a quantity of currency, a person's identification number, etc. That is, the data "104-106" is so vague/meaningless that the data does not even identify the units of measurement for the data, much less the context of these units.

Figure 4:
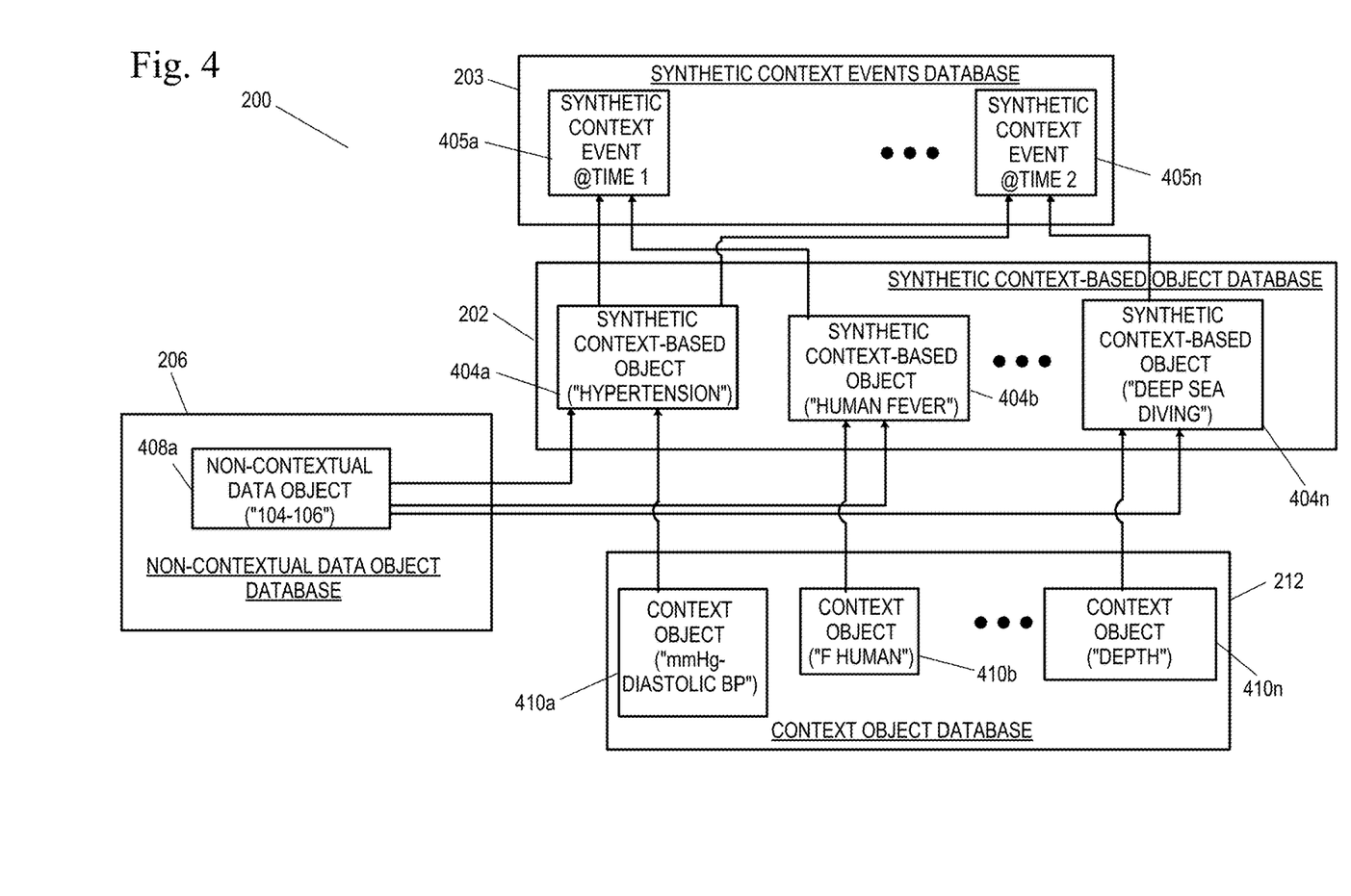
FIG. 4 illustrates an exemplary case in which synthetic context-based objects are defined for the non-contextual data object data "104-106".

In the example shown in FIG. 4, then, data (i.e., the term/values "104-106") from the non-contextual data object 408*a* is associated with (e.g., stored in or associated by a look-up table, etc.) a synthetic context-based object 404*a*, which is devoted to the subject-matter "hypertension". The term/values "104-106" from non-contextual data object 408*a* is also associated with a synthetic context-based object 404*b*, which is devoted to the subject-matter "human fever" and a synthetic context-based object 404*n*, which is devoted to the subject-matter "deep sea diving". In order to give contextual meaning to the term/values "104-106" (i.e., define the term/values "104-106") in the context of "hypertension", context object 410*x*, which contains the context data "millimeters of mercury" and "diastolic blood pressure" is associated with (e.g., stored in or associated by a look-up table, etc.) the synthetic context-based object 404*a*. Thus, multiple context data can provide not only the scale/units (millimeters of mercury) context of the values "104-106", but the data can also provide the context data "diastolic blood pressure" needed to identify the subject-matter (hypertension) of the synthetic context-based object 404*a*.

Associated with the synthetic context-based object 404*b* is a context object 410*b*, which provides the context data of "degrees on the Fahrenheit scale" and "human" to the term/values "104-106" provided by the non-contextual data object 408*a*. Thus, the synthetic context-based object 404*b* now defines term/values "104-106" as that which is related to the subject matter of "human fever" Similarly, associated with the synthetic context-based object 404*n* is a context object 410*n*, which provides the context data of "depth" to the term/values "104-106" provided by the non-contextual data object 408*a*. In this case, the generator of the synthetic context-based object database 202 determines that high numbers of feet (depth) are used to define deep ocean pressures. Thus, the synthetic context-based object 404*n* now defines term/values "104-106" as that which is related to the subject matter of "deep sea diving".

A synthetic context event 405*d* may include synthetic context-based object 404*a*, which is devoted to the subject-matter "hypertension" and synthetic context-based object 404*b*, which is devoted to the subject matter "human fever" and associated context objects 410*a*-410*n*, which further provide context relative to the synthetic context-based objects 404*a*, 404*b*. The repeating pattern of context for the synthetic event could be the number of times an adult had had a fever of 104-106° F. when they were a child between the ages 0-4 years, and also the number of times the adult has had a diastolic blood pressure of 104-106 mmHg in the last ten years.

Another synthetic context event 405*e* may include synthetic context-based object 404*b*, which is devoted to the subject-matter "hypertension" and synthetic context-based object 404*n*, which is devoted to the subject matter "deep sea diving" and associated context objects 410*b*-410*n*, which further provide context relative to the synthetic context-based objects 404*b*, 404*n*. The repeating pattern of context for the synthetic event could be the number of times a human dived to a specific depth of water, 104-106 feet, and the number of times the human has had a diastolic blood pressure level of 104-106 mmHg, over a specific time period, for example three years. The synthetic context event is relating seemingly unrelated context together regardless of the cardinality or granularity of the data or context.

In one embodiment, the non-contextual data object may provide enough self-context to identify what the datum is, but not what it means and/or is used for. For example, consider the datum "statin" contained within the non-contextual data object 508*a* shown in FIG. 5. In the example shown in FIG. 5, datum (i.e., the term "statin") from the non-contextual data object 508*a* is associated with (e.g., stored in or associated by a look-up table, etc.) a synthetic context-based object 504*a*, which is devoted to the subject-matter "cardiology". The term "statin" from non-contextual data object 508*a* is also associated with a synthetic context-based object 504*b*, which is devoted to the subject-matter "nutrition" and a synthetic context-based object 504*a*, which is devoted to the subject-matter "tissue inflammation". In order to give contextual meaning to the term "statin" (i.e., define the term "statin") in the context of "cardiology", context object 510*a*, which contains the context data "cholesterol reducer" is associated with (e.g., stored in or associated by a look-up table, etc.) the synthetic context-based object 504*a*. Thus, the datum "cholesterol reducer" from context object 510*a* provides the context to understand that "statin" is used in the context of the subject-matter "cardiology".

Figure 5:
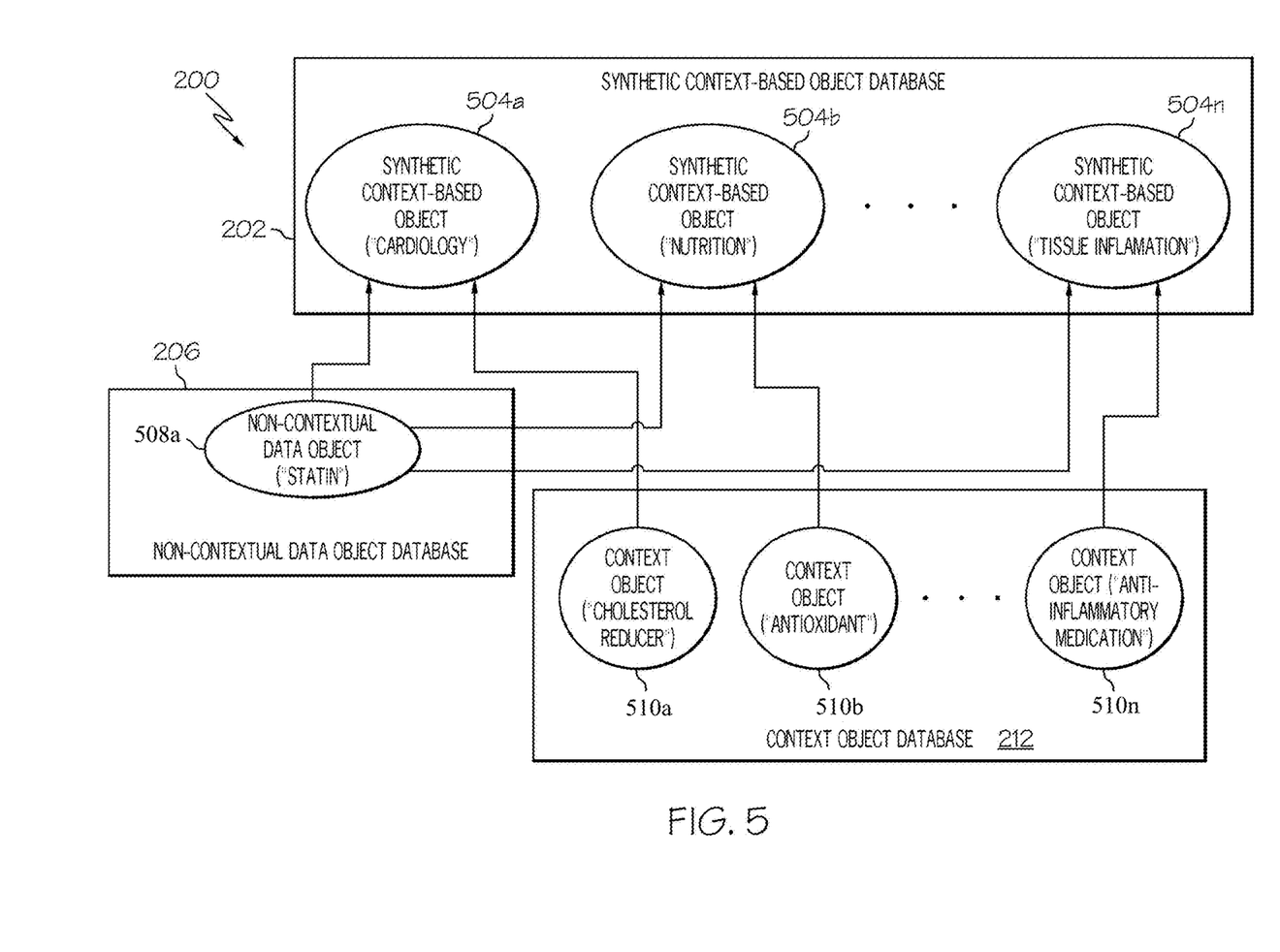
FIG. 5 depicts an exemplary case in which synthetic context-based objects are defined for the non-contextual data object datum "Statin".

Referring to FIG. 5, associated with the synthetic context-based object 504*b* is a context object 510*b*, which provides the context/datum of "antioxidant" to the term "statin" provided by the non-contextual data object 508*a*. That is, a statin has properties both as a cholesterol reducer as well as an antioxidant. Thus, a statin can be considered in the context of reducing cholesterol (i.e., as described by the subject-matter of synthetic context-based object 504*a*), or it may considered in the context of being an antioxidant (i.e., as related to the subject-matter of synthetic context based object 504*b*). Similarly, a statin can also be an anti-inflammatory medicine. Thus, associated with the synthetic context-based object 504*n* is the context object 510*n*, which provides the context data of "anti-inflammatory medication" to the term "statin" provided by the non-contextual data object 508*a*. This combination identifies the subject-matter of the synthetic context-based object 504*n* as "tissue inflammation".

Figure 9:
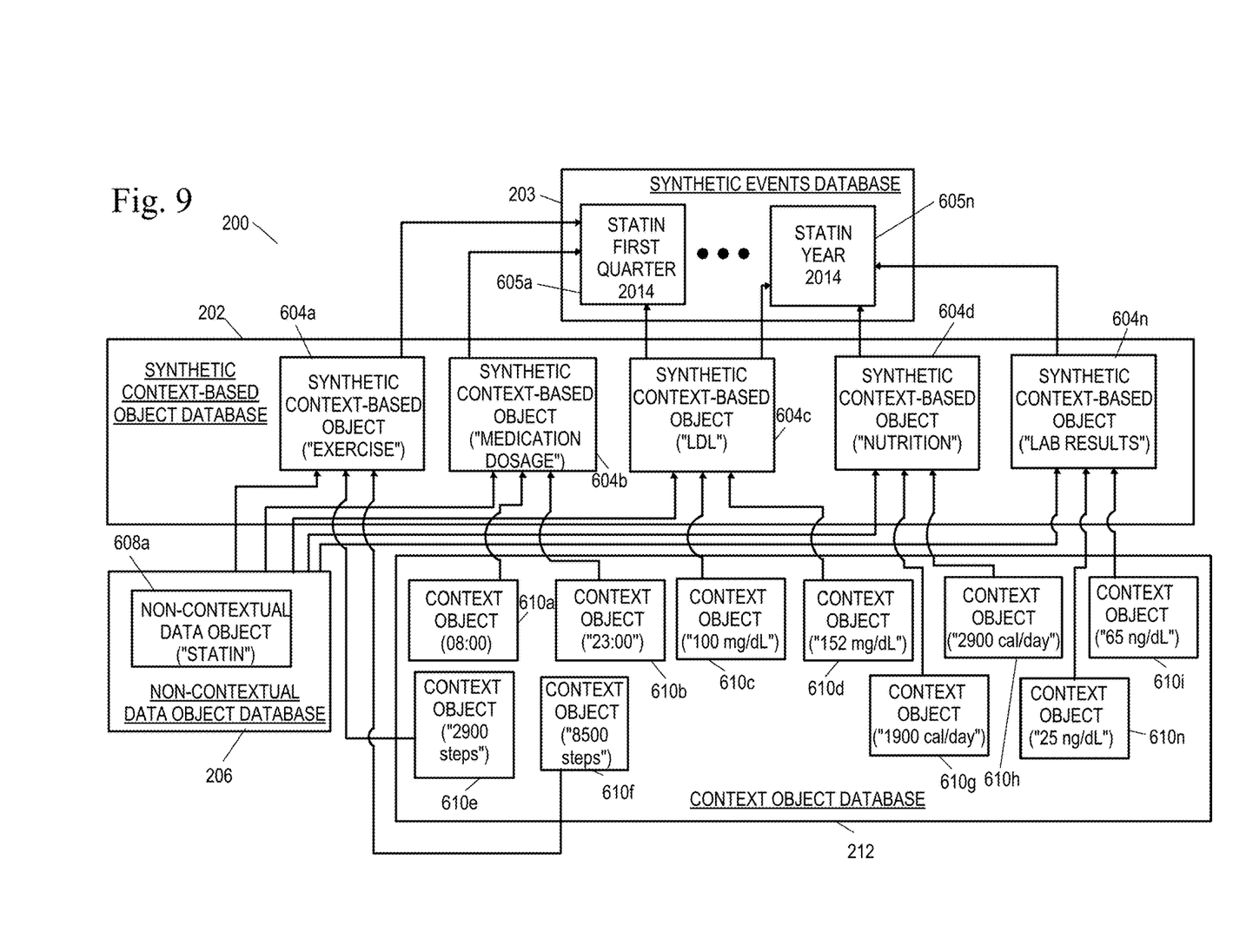
FIG. 9 depicts an exemplary case in which synthetic context-based objects are defined for the non-contextual data object datum "Statin" and includes synthetic time events.

In another example, as shown in FIG. 9, the non-contextual data object 608*a* of "statin" is further defined by synthetic context-based objects 604*a*-604*n*, which are each associated with context objects 610*a*-610*n*. In this case, the non-contextual data object 608*a* of "statin" is provided context or further defined by possible factors that affect the efficacy of the statin for a user. The efficacy of the statin is provided with context by synthetic context-based objects and may be "exercise" 604a, "medication dosage" 604b, "LDL" 604c, "nutrition" 604d, "lab results" 604n. For each of the synthetic context-based objects are context objects 610a-610n. For example, the synthetic context-based object of "exercise" 604a may be linked to context object "2900 steps/day" 610e or "8500 steps/day" 610f; the synthetic context-based object of "medication dosage" 604b may be linked to context object "08:00" 610a and "23:00" 610b in hours and minutes corresponding to the time of day in which the statin is ingested; the synthetic context-based object of low-density lipoprotein cholesterol in the blood "LDL" 604c may be linked to context object "100 mg/dL" 610c or "152 mg/dL" 610d; the synthetic context-based object of "nutrition" 604d may be linked to context object "1900 calories/day" 610g or "2900 calories/day" 610h; the synthetic context-based object of "lab results" 604n may be linked to context object "25 ng/dL" 610h or "65 ng/dL" 610n.

A synthetic context event 605d of "statin first quarter 2014" could represent a time of day a user ingests the statin, a level of change of the user's LDL within a 3 month time and the amount of exercise of the user, relating seemingly unrelated context regarding a user relative to how it may produce a pattern that affects the efficacy of a statin. Another example of a synthetic context event 605n could be "statin 2014" which represents level change of a user's LDL level, average number of calories per day consumed and amount of ferritin over a twelve month period during the year 2014.

Once the synthetic context-based objects are defined, they can be linked to data stores. A data store is defined as a data repository of a set of integrated data, such as text files, video files, webpages, etc. Multiple data stores may be organized into a data structure.

That is, in one embodiment, the data structure is a database of text documents (represented by one or more of the data stores), such as journal articles, webpage articles, electronically-stored business/medical/operational notes, etc.

In one embodiment, the data structure is a database of text, audio, video, multimedia, etc. files (represented by one or more of the data stores) that are stored in a hierarchical manner, such as in a tree diagram, a lightweight directory access protocol (LDAP) folder, etc.

In one embodiment, the data structure is a relational database, which is a collection of data items organized through a set of formally described tables. A table is made up of one or more rows, known as "tuples". Each of the tuples (represented by one or more of the data stores) share common attributes, which in the table are described by column headings. Each tuple also includes a key, which may be a primary key or a foreign key. A primary key is an identifier (e.g., a letter, number, symbol, etc.) that is stored in a first data cell of a local tuple. A foreign key is typically identical to the primary key, except that it is stored in a first data cell of a remote tuple, thus allowing the local tuple to be logically linked to the foreign tuple.

In one embodiment, the data structure is an object oriented database, which stores objects (represented by one or more of the data stores). As understood by those skilled in the art of computer software, an object contains both attributes, which are data (i.e., integers, strings, real numbers, references to another object, etc.), as well as methods, which are similar to procedures/functions, and which define the behavior of the object. Thus, the object oriented database contains both executable code and data In one embodiment, the data structure is a spreadsheet, which is made up of rows and columns of cells (represented by one or more of the data stores). Each cell (represented by one or more of the data stores) contains numeric or text data, or a formula to calculate a value based on the content of one or more of the other cells in the spreadsheet.

In one embodiment, the data structure is a collection of universal resource locators (URLs) for identifying a webpage, in which each URL (or a collection of URLs) is represented by one or more of the data stores.

These described types of data stores are exemplary, and are not to be construed as limiting what types of data stores are found within data structure.

Figure 6:
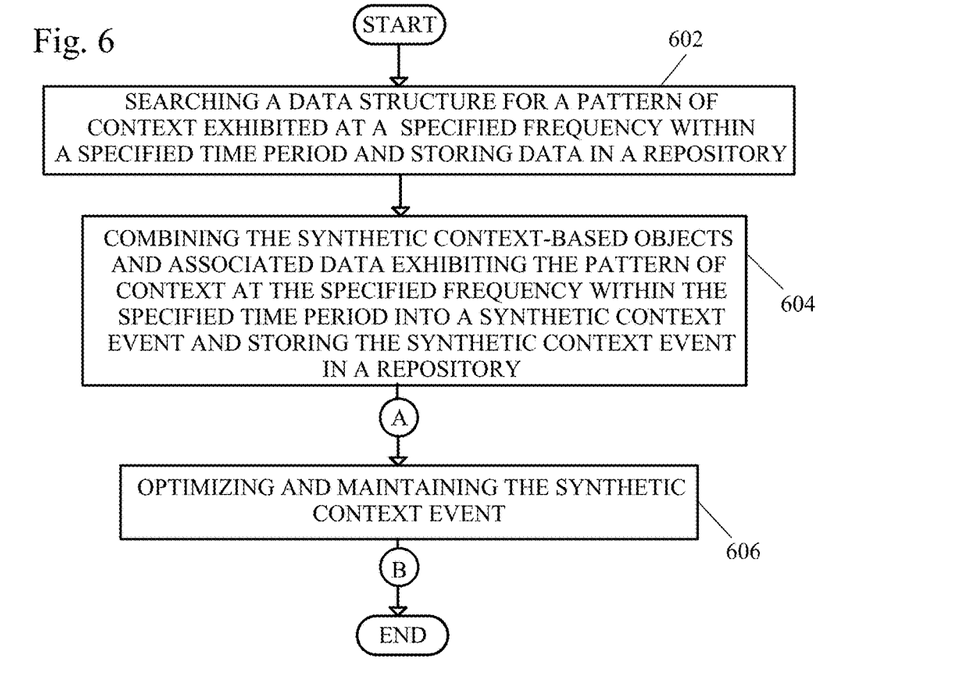
FIG. 6 shows a method for the generation and maintenance of synthetic events from synthetic context-based objects.
Figure 7:
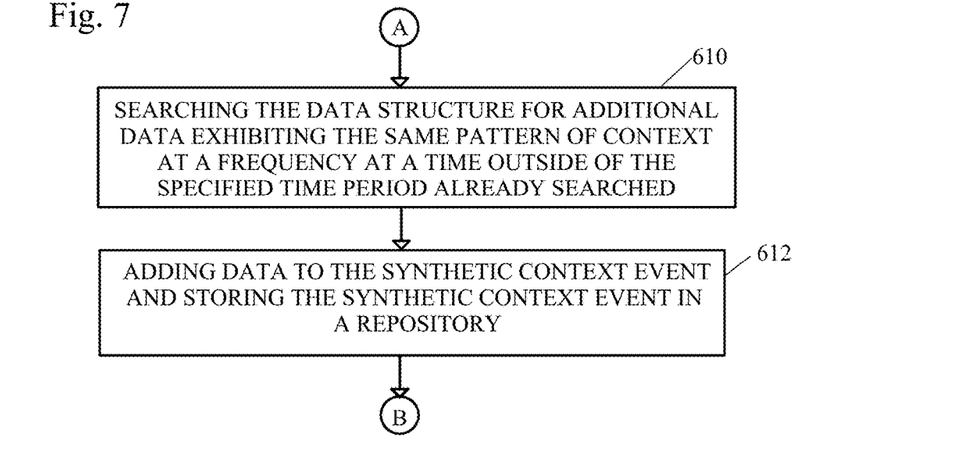
FIG. 7 shows a method of optimizing and maintaining the synthetic context event.

FIGS. 6-7 show flowcharts of a method for the generation and maintenance of synthetic events from synthetic context-based objects.

In a first step, a data structure is searched for data exhibiting a repeating pattern of context or pattern expressed at a set frequency within a specified time period (step 602), for example by the synthetic context event program 66. The results are preferably stored in a repository or database, for example repository 53 of FIG. 1 or synthetic context-based object database 202 of FIG. 2. The specified time period and the frequency of how often a pattern of context may need to be present or exhibit in order to satisfy the search may be set and altered by a user. The specified time period and the frequency in which the pattern of context may need to exhibit is preferably received prior to step 602.

The data, which is preferably synthetic context-based objects and any associated data, that matches the search of step 602 are combined into a synthetic context event and the synthetic context events are stored in a repository or database (step 604), for example repository 53 of FIG. 1 or synthetic event database 203 of FIG. 2. A synthetic context event is at a non-contextual data object and at least one synthetic context-based object and associated data or information from clustering of information based on preset parameters, which in this case are the presence of a pattern of context repeating a specific number of times or occurring at a specified frequency within a specific time period.

The synthetic context events are optimized or maintained (step 606) and the method ends. Referring to FIG. 7, step 606 is shown in greater detail. The data structure is searched for additional data exhibiting the searched pattern of context at a determined frequency outside of the specified time period originally searched or at another specified time period and the results are stored in a repository or database (step 610), for example by the synthetic context event program 66. The data structure may be a database of text documents, database of text, audio, video, etc. . . . , a relational database, an object oriented database, a spreadsheet, a collection of URLs, or other data structure. The data outside of the specified time period that has the pattern at a specific frequency or number of repeats is added to the synthetic context event, for example by the synthetic context event 66, and the synthetic context event is stored in a repository or database (step 612).

It should be noted that the specified time period of step 602 is preferably different than the specified time period of step 610. Furthermore, the frequency of the pattern of context exhibited within the time period may be the same in both steps 602 and 610 or may differ. The frequency may be specified as being continuous or discontinuous within the specified time period.

Referring back to FIG. 9 as an example, the synthetic context-based object database 202 and context object database 212 is searched for a pattern of context exhibited at a specified frequency within a specified time period. In the context-based object database 212, numerous data associated with thousands of patients is stored. For example, time in which the patient takes the statin in hours and minutes 610*a*, 610*b*; dosage of ferritin based on the patient's bloodwork in nanograms per milliliter 610*i*, 610*n*; the patient's LDL level as monitored every month in milligrams per deciliter 610*c*, 610*d*; and the amount of exercise the patient does per day in steps 610*e*, 610*f*; and calories consumed each day 610*g*, 610*h*. The data is grouped into synthetic context-based objects 604*a*-604*n*, such as nutrition, lab results, etc. . . . as factors which may be linked to statins (non-contextual data object).

A researcher or doctor may specify that they want to compile a synthetic context event in which a pattern of context associated with time of day in which the statin is taken and a level of change (decrease) of the patient's LDL as monitored has occurred in a three month time frame as well as how many steps were taken in the three month time frame has affected the efficacy of the statin. Therefore, in this example, the first specified time period would be three months.

Multiple synthetic context based objects which meet the criteria and their associated context objects including data exhibiting the pattern of context at the specified frequency within the specified time period are combined into a synthetic context event.

The synthetic event created 605*d*, for example statin first quarter 2014, would include exercise distance, dosage time, LDL level and associated data in specific time frame. The synthetic context event creates a data object that can treated as a binary data object, even though the data which comprises the event is heterogeneous, based on different context, and is meaningless if not grouped together.

The synthetic event may be updated as additional data becomes available. The pattern or range of time for a pattern of context to be present may be altered. For example, the second specified time period may be a different three month period, for example third quartile 2014 with the same context. The synthetic context events of first quartile 2014 and third quartile 2014 could them be compared since the data can be treated as binary.

In another example, a second specified time period of twelve months with the same pattern of context, for example time of day in which the statin is taken and a level of change (decrease) of the patient's LDL as monitored has occurred in a three month time frames as well as how many steps were taken in the three month time frames could be updated to represent a twelve month time period.

Alternatively, the frequency of the pattern of context can also be altered. For example, the level of change or decrease of a patient's LDL may be for a one year time span instead of three months. Some patients may not have had a decrease of LDL within three months of taking a statin, but instead saw a decrease one year from taking the statin.

FIG. 8 illustrates internal and external components of client computer 52 and server computer 54 in which illustrative embodiments may be implemented. In FIG. 8, client computer 52 and server computer 54 include respective sets of internal components 800*a*, 800*b*, and external components 900*a*, 900*b*. Each of the sets of internal components 800*a*, 800*b* includes one or more processors 820, one or more computer-readable RAMs 822 and one or more computer-readable ROMs 824 on one or more buses 826, and one or more operating systems 828 and one or more computer-readable tangible storage devices 830. The one or more operating systems 828, a surprisal context filter program 66 are stored on one or more of the computer-readable tangible storage devices 830 for execution by one or more of the processors 820 via one or more of the RAMs 822 (which typically include cache memory). In the embodiment illustrated in FIG. 8, each of the computer-readable tangible storage devices 830 is a magnetic disk storage device of an internal hard drive. Alternatively, each of the computer-readable tangible storage devices 830 is a semiconductor storage device such as ROM 824, EPROM, flash memory or any other computer-readable tangible storage device that can store a computer program and digital information.

Each set of internal components 800*a*, 800*b* also includes a R/W drive or interface 832 to read from and write to one or more portable computer-readable tangible storage devices 936 such as a CD-ROM, DVD, memory stick, magnetic tape, magnetic disk, optical disk or semiconductor storage device. A surprisal context filter program 66 can be stored on one or more of the portable computer-readable tangible storage devices 936, read via R/W drive or interface 832 and loaded into hard drive 830.

Each set of internal components 800*a*, 800*b* also includes a network adapter or interface 836 such as a TCP/IP adapter card. A synthetic context event program 66 can be downloaded to client computer 52 and server computer 54 from an external computer via a network (for example, the Internet, a local area network or other, wide area network) and network adapter or interface 836. From the network adapter or interface 836, a synthetic context event program 66 is loaded into hard drive 830. The network may comprise copper wires, optical fibers, wireless transmission, routers, firewalls, switches, gateway computers and/or edge servers.

Each of the sets of external components 900*a*, 900*b* includes a computer display monitor 920, a keyboard 930, and a computer mouse 934. Each of the sets of internal components 800*a*, 800*b* also includes device drivers 840 to interface to computer display monitor 920, keyboard 930 and computer mouse 934. The device drivers 840, R/W drive or interface 832 and network adapter or interface 836 comprise hardware and software (stored in storage device 830 and/or ROM 824).

A synthetic context event program 66 can be written in various programming languages including low-level, high-level, object-oriented or non object-oriented languages. Alternatively, the functions of a synthetic context event program 66 can be implemented in whole or in part by computer circuits and other hardware (not shown).

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Having thus described the invention of the present application in detail and by reference to embodiments thereof, it will be apparent that modifications and variations are possible without departing from the scope of the invention defined in the appended claims.

What is claimed is:

1. A method of generating and maintaining synthetic context events from a data structure comprising:
    a context object database having a plurality of context objects;
    a non-contextual data object database having at least one non-contextual data object;
    a synthetic context-based object database having a plurality of synthetic context-based objects associated with the plurality of context objects, the non-contextual data objects being linked to the synthetic context-based objects; and
    a synthetic context event database comprising synthetic context events linked to the synthetic context-based objects, the synthetic context events each representing future physically or logically observable potential happenings;
    the method comprising the steps of:
        a computer searching the synthetic context-based objects identifying a specific subject matter from multiple subject matters and associated data of context objects for a pattern of context exhibited at a first specified frequency within a first specified time period within the synthetic context-based object database;

the computer combining the synthetic context-based objects and associated data of context objects exhibiting the pattern of context exhibited at the first specified frequency within the first specified time period into a synthetic context event representing a physically or logically observable event potentiating a future event occurring based on the synthetic context-based objects and associated data of the context objects stored within the synthetic context event database; and the computer optimizing and maintaining the synthetic context event by searching the data structure for additional synthetic context-based objects and associated data exhibiting a same pattern of context at a second specified time period different than the first specified time period and adding the additional synthetic context-based objects and associated data to the synthetic context event.

2. The method of claim 1, wherein the step of the computer optimizing and maintaining the synthetic context event by searching the data structure for additional synthetic context-based objects and associated data exhibiting the same pattern of context at the second specified time period further comprises searching for the same pattern of context exhibited at the first specified frequency.

3. The method of claim 1, wherein the step of the computer optimizing and maintaining the synthetic context event by searching the data structure for additional synthetic context-based objects and associated data exhibiting the same pattern of context at the second specified time period further comprises searching for the same pattern of context exhibited at a second specified frequency, different than the first specified frequency.

4. The method of claim 3, wherein the second specified frequency is continuous.

5. The method of claim 3, wherein the second specified frequency is discontinuous.

6. The method of claim 1, wherein the first specified frequency is continuous.

7. The method of claim 1, wherein the first specified frequency is discontinuous.

8. The method of claim 1, wherein prior to the step of the computer searching a data structure of synthetic context-based objects identifying a specific subject matter from multiple subject matters and associated data for a pattern of context exhibited at a first specified frequency within a first specified time period within the synthetic context-based object database, the computer receives at least the first specified frequency and the first specified time period.

9. The method of claim 1, wherein the context object database contains data associated with medical patients, with the data in the context object database being selected from the group consisting of: time in which patient takes medication, dosage of the medication within the patient's bloodwork, patient's particle count within their bloodwork, exercise performed by the patient per day, and calories consumed by the patient each day, with the data being grouped into synthetic context-based objects selected from the group consisting of lab results, nutrition, and exercise, wherein the at least one non-contextual data object is a statin;

wherein the pattern of context at a first specified time period of three months within the synthetic context-based object data based searched for is a pattern of context associated with: a time of day in which the statin is taken by the patient and a decrease in a level of the patient's particle count within their bloodwork in the first specified time period affected the efficacy of the statin for the patients;

wherein the synthetic context event includes data from the first specified time period, exercise distance, dosage time and particle level; and wherein the second specified time period is twelve months.

10. A computer program product for generating and maintaining synthetic context events from a data structure comprising:

a context object database having a plurality of context objects;

a non-contextual data object database having at least one non-contextual data object;

a synthetic context-based object database having a plurality of synthetic context-based objects associated with the plurality of context objects, the non-contextual data objects being linked to the synthetic context-based objects;

a synthetic context event database comprising synthetic context events linked to the synthetic context-based objects, the synthetic context events each representing future physically or logically observable potential happenings; and a computer coupled to the data structure, the computer comprising at least one processor, one or more memories, one or more computer readable storage media, the computer program product comprising a computer readable storage medium having program instructions embodied therewith, the program instructions executable by the computer to perform a method comprising:

searching, by the computer, the synthetic context-based objects identifying a specific subject matter from multiple subject matters and associated data of context objects for a pattern of context exhibited at a first specified frequency within a first specified time period within the synthetic context-based object database;

combining, by the computer, the synthetic context-based objects and associated data of context objects exhibiting the pattern of context exhibited at the first specified frequency within the first specified time period into a synthetic context event representing a physically or logically observable event potentiating a future event occurring based on the synthetic context-based objects and associated data of the context objects stored within the synthetic context event database; and optimizing and maintaining, by the computer, the synthetic context event by searching the data structure for additional synthetic context-based objects and associated data exhibiting a same pattern of context at a second specified time period different than the first specified time period and adding the additional synthetic context based objects and associated data to the synthetic context event.

11. The computer program product of claim 10, wherein optimizing and maintaining, by the computer, the synthetic context event by searching the data structure for additional synthetic context-based objects and associated data exhibiting the same pattern of context at the second specified time period further comprises searching, by the computer, for the same pattern of context exhibited at the first specified frequency.

12. The computer program product of claim 10, wherein optimizing and maintaining, by the computer, the synthetic context event by searching the data structure for additional synthetic context-based objects and associated data exhibiting the same pattern of context at the second specified time period further comprises searching, by the computer, for the same pattern of context exhibited at a second specified frequency, different than the first specified frequency.

13. The computer program product of claim 10, wherein the first specified frequency is continuous.

14. The computer program product of claim 10, wherein the first specified frequency is discontinuous.

15. The computer program product of claim 10, wherein prior to searching, by the computer, the synthetic context-based objects identifying a specific subject matter from multiple subject matters and associated data of context objects for a pattern of context exhibited at a first specified frequency within a first specified time period within the synthetic context-based object database, receiving, by the computer, at least the first specified frequency and the first specified time period.

16. A computer system for generating and maintaining synthetic context events from a data structure comprising:
   a context object database having a plurality of context objects;
   a non-contextual data object database having at least one non-contextual data object;
   a synthetic context-based object database having a plurality of synthetic context-based objects associated with the plurality of context objects, the non-contextual data objects being linked to the synthetic context-based objects;
   a synthetic context event database comprising synthetic context events linked to the synthetic context-based objects, the synthetic context events each representing future physically or logically observable potential happenings; and
   the computer system comprising a computer coupled to a data structure, the computer comprising at least one processor, one or more memories, one or more computer readable storage media having program instructions executable by the computer to perform the program instructions comprising:
      searching, by the computer, the synthetic context-based objects identifying a specific subject matter from multiple subject matters and associated data of context objects for a pattern of context exhibited at a first specified frequency within a first specified time period within the synthetic context-based object database;
      combining, by the computer, the synthetic context-based objects and associated data of context objects exhibiting the pattern of context exhibited at the first specified frequency within the first specified time period into a synthetic context event representing a physically or logically observable event potentiating a future event occurring based on the synthetic context-based objects and associated data of the context objects stored within the synthetic context event database; and
      optimizing and maintaining, by the computer, the synthetic context event by searching the data structure for additional synthetic context-based objects and associated data exhibiting a same pattern of context at a second specified time period different than the first specified time period and adding the additional synthetic context based objects and associated data to the synthetic context event.

17. The system of claim 16, wherein optimizing and maintaining, by the computer, the synthetic context event by searching the data structure for additional synthetic context-based objects and associated data exhibiting the same pattern of context at the second specified time period further comprises searching, by the computer, for the same pattern of context exhibited at the first specified frequency.

18. The system of claim 16, wherein optimizing and maintaining, by the computer, the synthetic context event by searching the data structure for additional synthetic context-based objects and associated data exhibiting the same pattern of context at the second specified time period further comprises searching, by the computer, for the same pattern of context exhibited at a second specified frequency, different than the first specified frequency.

19. The system of claim 16, wherein the first specified frequency is discontinuous.

20. The system of claim 16, wherein prior to searching, by the computer, the synthetic context-based objects identifying a specific subject matter from multiple subject matters and associated data of context objects for a pattern of context exhibited at a first specified frequency within a first specified time period within the synthetic context-based object database, receiving, by the computer, at least the first specified frequency and the first specified time period.

* * * * *